United States Patent [19]

Trelease et al.

[11] Patent Number: 4,780,323

[45] Date of Patent: Oct. 25, 1988

[54] PROCESS OF PREPARING A TRICHINAE-FREE PORK PRODUCT

[75] Inventors: Richard D. Trelease, Downers Grove; Harry Rock, Wood Dale; Paul K. Zubinski, Oak Brook Terrace, all of Ill.

[73] Assignee: Swift-Eckrich, Inc., Oak Brook, Ill.

[21] Appl. No.: 947,511

[22] Filed: Dec. 29, 1986

[51] Int. Cl.$^4$ ............................................. A23B 4/00
[52] U.S. Cl. .................................... 426/646; 426/520
[58] Field of Search ............... 426/641, 646, 412, 413, 426/513, 520

[56] References Cited

U.S. PATENT DOCUMENTS 352,094  11/1886  Loos .................................... 426/641
3,432,311  3/1969  Gruner ............................ 426/641 X

OTHER PUBLICATIONS

Crouse et al, "Salt and Aging Time Effects on the Viability of Trichinella spirals in Heavy Dry-Cured Hams and Shoulders", Journal of Food Science, vol. 34 (1969), pp. 530-531.

Modic et al., "Influence of Certain Physico-Chemical Factors on the Possibilities of T. Spiralis Larvae Survival for Meat Products", Yugoslav Institute of Meat Technology, pp. 309-312, 1980.

*Primary Examiner*—Arthur L. Corbin
*Attorney, Agent, or Firm*—Edward T. McCabe

[57] ABSTRACT

A process for preparing meat products which may inherently contain trichinae parasites so as to insure that the product after treatment is free of live trichinae organisms. The process comprises the steps of subdividing the meat to expose trichinae to treatment conditions and contacting the subdivided meat with salt, forming the salted subdivided product and heating sequentially at a temperature and for a time sufficient to destroy the salt conditioned trichinae organisms but insufficient to adversely affect the texture of the meat.

17 Claims, No Drawings

PROCESS OF PREPARING A TRICHINAE-FREE PORK PRODUCT

BACKGROUND OF THE INVENTION

This invention relates to a process for converting meat which may contain trichinae parasites in order to render the meat free of live trichinae. The method comprises subdividing the meat by comminuting, abrading or otherwise to reduce the meat particles to a size of $\frac{3}{4}''$ or less, contacting the subdivided particles with salt and mixing to distribute the salt throughout the meat and then subjecting the pretreated particles to mild heat treatment for a time sufficient to destroy the trichinae present therein.

While the incidence of trichinosis has noticeably decreased over the last several years, the development of the disease remains an important public health problem. Trichinella spiralis parasitic microscopic organisms are still found in swine and in some wild animals which are used as human food. It is necessary therefore to subject pork products to prolonged curing and processing to protect the consumer against trichinosis. Garbage feeding of swine often provides the source of live trichinae and the proliferation of rats promote the distribution, growth and development of the larvae. The percentage of hogs infected in the United States is low, usually much less than one percent but food processors must handle a pork in a manner that insures destruction of the larvae in all cases. Certified pork is available and such product is guaranteed free of live trichina but this meat is expensive because it has been frozen for a time to destroy the live larvae.

The U.S. Department of Agriculture, Food Safety and Inspection Service, recently took action to amend The Federal Meat Inspection regulations relating to Trichina. In a notice in the Federal Register Vol. 48, No. 48 on Mar. 10, 1983, under the heading "Trichina Control Requirements", the USDA listed prescribed methods for trichina destruction (heating, freezing, salting and drying). These procedures, while adequate to destroy Trichinella spiralis impose limitations on the industry in requiring longer times or higher temperature treatments than appeared necessary. Further, it was noted that detection methods including microscopic and serological techniques are so expensive or complex that they are not readily adaptable to manufacturing methods. As a result the USDA proposed methods for treating pork products to ensure that these products are free of live trichina while allowing a greater variety of treating conditions than previous regulations permitted but still are limiting insofar as manufacturing operations are concerned. The amended methods involve "controlled freezing" and various curing, fermentation and smoking procedures. In all of the permitted procedures it is necessary to hold the product under freezing or heating conditions for extended periods of time. This in turn imposes limitations on the capacity of the plant.

Of prime importance to industry is the development of procedures whereby trichina destruction is accomplished and assured in the shortest processing time. The capacity of any processing plant is thereby increased substantially. Thus heating and freezing are two accepted procedures but each adds to the cost of the product and in the case of cooking (heating to 137° F. or higher), it can be objectionable where a fully cooked product such as frankfurters or bologna is not desired.

SUMMARY OF THE PRESENT INVENTION

The system of this invention is based upon the discovery that by control of a number of factors such as salt content, particle size and heating time and temperature it is possible to treat meat that may contain *Trichinella spira* in a manner which insures trichina free meat yet allows for more moderate treatment conditions than have heretofore been considered possible. It is only by providing a prescribed interrelationship between these factors that the unexpected result is obtained but by maintaining conditions in accordance with our method greatly shortened processing times are attainable. The process comprises subdividing meat which may contain *T. spiralis* to a particle size no greater than about $\frac{1}{2}''$, contacting the meat with salt and heating the meat in an atmosphere maintained at a moderate temperature for a time (usually less than 24 hours sufficient to destroy Trichina but not sufficient to adversely affect the textural qualities of the meat for use in dry and semi-dry sausage products. It is thus possible to produce processed meat products such as dry sausages (Genoa Salami, Hard Salami and Peperoni) and fermented sausages (Summer Sausage and Thuringer) in a shorter period of time than had been thought possible heretofore.

DESCRIPTION OF PREFERRED EMBODIMENTS

It is an object of the invention to provide a method for treating meat which may contain live trichinae under conditions which insure destruction of said trichinae but which do not completely denature the protein of said meat nor require long holding times at elevated temperatures.

Another object of the invention is to provide a method for producing a trichinae free sausage product from meat which may contain trichinae by treating the raw meat with salt and holding the salt treated meat under mild time-temperature conditions whereby trichinae are destroyed in less than 24 hours.

Another object of the invention is to provide a method for producing a trichinae free sausage product from meat which may contain trichinae by treating the raw meat with salt and holding the salt treated meat under mild time temperatures conditions whereby trichinae are destroyed in less than about 7 hours in 55 mm. diameter or smaller product.

Still another object of the invention is to provide a method for producing dry or semi-dry sausage from meat which may contain live trichinae by subdividing the meat to a particle size of not more than about $\frac{1}{2}$ inch, contacting the particles with salt and heating the salt treated particles to house temperature of 90° F. for an hour, 100° F. for an hour, 110° F. for one hour, 120° F. for one hour, followed by the heating step at about 125° F. for at least seven hours.

Other objects of the invention if not specifically set forth herein will be readily apparent to those skilled in the art from the detailed description of the invention which follows.

The invention although not specifically limited to the sausage industry, has particular application thereto. Substantial improvements are provided by the method of the invention in the production of dry, semi-dry, fermented and other specialty meats. In the production of dry and semi-dry sausages it has been the practice after formulating the product to subject it to fermentation and generally heating. Drying is subsequently carried out under temperatures and time conditions in a controlled atmosphere environment until a desired moisture protein ratio in the product is attained. Thus semi-dry sausage should have a moisture protein ratio of from 3.7 to 1 or a maximum of 3.1 to 1, if shelf-stable, while Genoa Salami moisture-protein ratio must not exceed 2.3 to 1. Hard Salami on the other hand is dried to a moisture-protein ratio of 1.9 to 1 while Peperoni moisture-protein ratio is no more than about 1.6 to 1.

In the past drying equipment and facilities have been such that the times and temperatures used for drying have been more than sufficient for trichinae destruction. Destruction has been achieved by longer term drying at moderate temperatures. With the development of more sophisticated controls and drying equipment it is now possible to dry the product to the required level at lower temperatures and for shorter times than previously. Temperatures mentioned herein are "house" or ambient temperatures in the area where the product is held. Temperatures mentioned are not product temperatures unless so specified.

This new efficiency in removal of water has provided the opportunity to realize striking improvements in the manufacturing process. It is possible to hold the meat for shorter periods of time and at lower temperatures than have been thought possible in the plant while achieving destruction of live trichinae. It follows that plant capacity is increased significantly.

Accordingly, while heretofore it has been necessary to hold products in the plant for a number of days, usually 14–50 days, it is now possible by the method of this invention to produce trichinae free sausage in 7–11 hours and usually in less than one day.

The sausage making process requires that the fresh meat which may contain live trichinae be comminuted and stuffed into casings for further handling. The comminuted product is mixed with salt in an amount of at least about 2.7–3.33 lbs. salt to each 100 lbs. of meat. Ordinarily, product containing the higher amount of salt requires less severe heat treatment to destroy trichinae than product containing lesser amounts 2.7 lbs.) of salt. The salt treated comminuted meat is then stuffed into cylindrical flexible film casings to provide a formed product of about 55 mm. or less diameter or 105 mm. or less diameter, being sizes of casings commonly used in the art. Of course other dimensions for the product within this range can be treated similarly. Penetration of heat into the formed product occurs, as would be expected, more rapidly in the center of the smaller diameter product.

EXAMPLE I

A mixture of meat containing 100 lbs. of pork and beef containing well encysted trichinae was ground through a 5/32 inch plate, mixed with 2.7 lbs. salt and the salt was distributed uniformly throughout the product. The product was then stuffed into 55 mm. and 105 mm. diameter casings. The larger 105 mm. stuffed casings were held at the following times and temperatures:

| House or Ambient Temp. °F. | Time (hours) |
| --- | --- |
| 90 | 1st hr. |
| 100 | 2nd hr. |
| 110 | 3rd hr. |

-continued

| House or Ambient Temp. °F. | Time (hours) |
| --- | --- |
| 120 | 4th hr. |
| 125 | 5–11th hr. |

The products were completely free of live trichinae after only 11 hours. The smaller casings 55 mm. product was treated as follows:

| House or Ambient Temp. °F. | Time hrs. |
| --- | --- |
| 100 | 1st hr. |
| 125 | 2nd thru 7th hr. |

The effect of the smaller diameter is evident since the product is completely free of live trichinae after only 7 hours.

EXAMPLE II

A mixture of meat containing 100 lbs. pork containing well encysted trichinae was ground through a 5/32 inch plate, mixed with 3.33 lbs. salt and the salt was distributed uniformly throughout the product. The salt treated product was stuffed into 105 mm. casings. The (105 mm. diameter) product was held under the following time and temperature conditions:

| House or Ambient Temp °F. | Time |
| --- | --- |
| 50 | 1–12th hr. |
| 90 | 13th hr. |
| 100 | 14th hr. |
| 110 | 15th hr. |
| 120 | 16th hr. |
| 125 | 17th–22th hr. |

The product was completely free of live trichinae after only twenty-two (22) hours.

EXAMPLE III

The meat mixture was a blend of trichinae infected and noninfected pork and beef. The level of trichinae in the infected meat was approximately 400 gram. The infected meat was used in the ratio of 70% to 30% non-infected meat so as to have about 200–250 cysts per gram in the blended meat. The infected meat was ground thru a ¼" plate. The non-infected pork and lean beef was ground thru ⅛" plate. To approximately 35# of the blended meat salt was added at the rate of 2.7#/100# of meat, sodium nitrite was added at the 150 ppm level, dextrose at the 2½% level and spice at the level of 3 oz. per 100# of meat. The blend was stuffed into 55 mm casings and immediately paced in the smoke-house. The first hour the house or ambient temperature was 100° F. and then for the next 6 hours it was held at 125° F. After showering the sausage, a sample was examined after a pepsin digestion and no live trichinae could be found. Samples were fed to rats and none of these rats became infected with trichinae.

EXAMPLE IV

Another 35# of meat was formulated and processed as in Example III except that the infected meat was ground thru a ⅛" plate. After showering, the sausage was found to be free of live trich-inae and did not infect the rats which were fed the sausage.

EXAMPLE V

Another 35# of meat was formulated and processed as in Example III except that all of the meat was ground thru a 5/32" plate. After showering, the sausage was found to be free of live trichinae and did not infect the rats which were fed the sausage.

In some tests it was found that even with sub-lethal heat treatments (that wouldn't destroy all of the trichinae by the end of the heat treatment that holding the sausage in the dry room at a temperature of not more than about 50° F. for a week or less would destroy all of the trichinae left at the end of the more mild heat treatment. Examples VI to IX illustrate this variation.

EXAMPLE VI

Another 35# of meat was formulated as in Example III, ground thru a 5/32" plate, and then stuffed into 105 mm casings. The stuffed casing was held at 80° F. for 12 hours and then heated 1 hour each at 90° F., 100° F., 110° F., 120° F., and then held at 125° F. for 6 hours. After showering, the sausage was sampled and inspected microscopically and after a pepsin digestion live trichinae could be found. After holding for 6 days at about 50° F. samples were fed to rats and none of them became infected.

EXAMPLE VII

35# of meat containing approximately 200-250 cysts per gram was formulated as in Example III, comminuted to 5/32" size, stuffed into 55 mm casing and then held at 50° F. for 12 hours before going thru the following heat treatment—1 hour at 100° F. house temperature and then 5 hours at 120° F. house temperature. After showering, the sausage still contained live trichinae as determined by microscopic examination of the pepsin digest. The product was then held 7 days in a dry room at 50° F. At the end of 7 days, the product was found to be trichinae free as determined both by microscopic examination of a pepsin digestion and by feeding samples to rats who did not become infected.

EXAMPLE VIII

Another 35# of meat was handled exactly as in Example VII except that the holding period at 50° F. was 24 hours. Again, at the end of the heating cycle some of the trichinae were still alive. After 5 days in the dry room at about 50° F. all of the trichinae were dead.

EXAMPLE IX

Another 35# of meat was handled as in Exampe VI except there was no holding time before the heating. After showering, no trichinae were found microscopically but 2 out of 10 rats fed the same type of sausage became infected. After holding the sausage an additional 6 days at about 50° F., all of the trichinae were found to be dead as determined microscopically and by feeding samples to rats.

Obviously many modifications and variations of the invention as hereinbefore set forth may be made without departing from the spirit and scope thereof, and therefore, only such limitations should be imposed as are indicated in the appended claims.

We claim:

1. A process for producing a trichinae-free pork product from pork which may contain live trichinae, comprising:
   (a) subdividing fresh pork to a particle size not substantially in excess of ¼ inch;
   (b) contacting the subdivided pork with salt in an amount of about 2.7% to 3.6% of salt based on the weight of the meat;
   (c) introducing the salt-containing subdivided pork into a forming zone wherein said product is formed as a cylindrical, rectangular or other cross-sectional length of product having a diameter or cross-sectional dimension of not more than about 150 millimeters; and then
   (d) heating the formed pork at a temperature of about 100 F. for about one hour, followed by heating at about 125° F. for about six hours to destroy all salt conditioned trichinae present in said pork without adversely affecting the texture of said pork as a sausage product.

2. The process of claim 1 in which product is formed as a cylinder, having a cross-section of about 17 to about 105 millimeters.

3. The process of claim 1 wherein thre meat is subdivided to a particular size in the range of ¼ inch or less.

4. The process of claim 1 wherein the moisture-protein ratio is adjusted to not more than about 1.6:1.

5. The process of claim 1 wherein the moisture-protein ratio is adjusted to not more than about 1.9:1.

6. The process of claim 1 wherein the moisture-protein ratio is adjusted to not more than about 3.7:1.

7. The process of claim 1 wherein the moisture-protein ratio is adjusted to not more than about 2.3:1.

8. The process of claim 1 wherein the moisture-protein ratio is adjusted to not more than about 3.1:1.

9. The process of claim 1 wherein the product is subjected to a fermentation step.

10. The process of claim 1 wherein the cross-sectional dimension is 55 millimeters and the heating is followed by a drying time at about 50° F. of 4 or more days.

11. The process of claim 1 wherein the cross-sectional dimension is 105 millimeters and the heating is followed by a drying time at 50 F. of 6 days or more.

12. A process for producing a trichinae-free pork product from pork which may contain live trichinae, comprising:
   (a) subdividing fresh pork to a particle size not substantially in excess of ¼ inch;
   (b) contacting the subdivided pork with salt in an amount of about 2.7% to 3.6% of salt based on the weight of the meat;
   (c) introducing the salt-containing subdivided pork into a forming zone wherein said product is formed as a cylindrical, rectangular or other cross-sectional length of product having a diameter or cross-sectional dimension of not more than about 105 millimeters and then;
   (d) heating the formed pork at a temnperature of about 90° F. for one hour, 100° F. for one hour, 110° F. for one hour, 120° F. for one hour, and 125° F. for seven hours to destroy all salt conditioned trichnae present in said pork without adversely affecting the texture of said pork as a sausage product and drying the heated pork to a desired moisture-protein ratio.

13. The process of claim 12 wherein the moisture-protein ratio is adjusted to not more than about 1.6:1.

14. The process of claim 2 wherein the moisture-protein ratio is adjusted to not more than about 1.9:1.

15. The process of claim 12 wherein the moisture-protein ratio is adjusted to not more than about 3.7:1.

16. The process of claim 2 wherein the moisture-protein ratio is adjusted to not more than about 2.3:1.

17. The process of claim 12 wherein the moisture-protein ratio is adjusted to not more than about 3.1:1.

* * * * *